(12) United States Patent
Lassen

(10) Patent No.: US 6,867,886 B2
(45) Date of Patent: Mar. 15, 2005

(54) APPARATUS FOR VIEWING ORIGINALS

(75) Inventor: Bernd Lassen, Mönkeberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 534 days.

(21) Appl. No.: 10/096,464

(22) Filed: Mar. 12, 2002

(65) Prior Publication Data

US 2002/0097451 A1 Jul. 25, 2002

Related U.S. Application Data

(63) Continuation of application No. PCT/DE00/03172, filed on Sep. 13, 2000.

(30) Foreign Application Priority Data

Sep. 28, 1999 (DE) .......................................... 199 46 358

(51) Int. Cl.⁷ ............................ H04N 1/04; G03B 27/04
(52) U.S. Cl. ....................... 358/487; 358/475; 358/497; 355/113; 399/378; 399/379
(58) Field of Search ................................. 358/487, 506, 358/509, 475, 497, 474, 494, 505; 399/211, 378, 380, 379; 355/119, 120, 113–118, 75; 382/312, 318; 250/234–236

(56) References Cited

U.S. PATENT DOCUMENTS

| 3,850,523 | A | * | 11/1974 | Skavnak ...................... 355/70 |
| 3,860,341 | A | * | 1/1975 | Tobias ......................... 355/115 |
| 4,035,078 | A | * | 7/1977 | Woo et al. .................... 355/77 |
| 6,208,437 | B1 | * | 3/2001 | Neushul ...................... 358/487 |
| 6,768,564 | B1 | * | 7/2004 | Gann .......................... 358/487 |

FOREIGN PATENT DOCUMENTS

| DE | 195 34 334 A1 | 3/1997 |
| EP | 0 593 206 A1 | 4/1994 |
| EP | 0 751 669 A2 | 1/1997 |
| JP | 62 075 630 A | 4/1987 |
| JP | 01 303 865 A | 12/1989 |
| JP | 10 126 577 A | 5/1998 |

* cited by examiner

*Primary Examiner*—Cheukgan Lee
(74) *Attorney, Agent, or Firm*—Laurence A. Greenberg; Werner H. Stemer; Ralph E. Locher

(57) ABSTRACT

An apparatus for viewing originals in a flatbed scanner includes a fixed copy holder and a movable scanning unit with a light source for illuminating the original to be scanned, an optoelectronic transducer, and a scanning lens for projecting a scanned line of the original onto the optoelectronic transducer. Fitted below the copy holder is a light source, and fastened on the scanning unit is a dispersion foil drawn under the copy holder by the scanning unit when the scanning unit is brought into a parking position and drawn away by the scanning unit when the scanning unit is moved over the copy holder during scanning. The dispersion foil is stretched tight by a suitable stretching apparatus when the scanning unit is in the parking position.

24 Claims, 2 Drawing Sheets

PRIOR ART

APPARATUS FOR VIEWING ORIGINALS

CROSS-REFERENCE TO RELATED APPLICATION

This application is a continuation of copending International Application No. PCT/DE00/03172, filed Sep. 13, 2000, which designated the United States.

BACKGROUND OF THE INVENTION

Field of the Invention

The apparatus relates to the field of electronic reproduction technology and relates to an apparatus for viewing originals in a flatbed scanner.

In an apparatus for scanning originals, such as pictures, graphics and texts, optoelectronically pixel by pixel and line by line, the originals to be scanned are converted into electric signals that are then further converted into digital data for processing in electronic reproduction technology. Such an apparatus is also denoted below as a scanner. For the case in which a flatbed scanner is involved, the originals are disposed on a flat copy holder, and an optoelectronic scanning unit scans the originals pixel by pixel and line by line, the copy holder and the scanning unit moving relative to one another. The scanning unit essentially has a light source for illuminating the original line by line, an optoelectronic transducer, for example, a photodiode row (CCD row), for converting the scanning light coming from the original into the image signals, as well as a scanning lens for projecting the original sharply onto the optoelectronic transducer and for adjusting the reproduction ratio in the case of originals of different size or for adjusting different scanning resolutions. Such a scanner is disclosed, for example, in German Published, Non-Prosecuted Patent Application DE 195 34 334.

There are flatbed scanners with a fixed copy holder and a scanning unit that moves along the copy holder in the secondary scanning direction, that is to say, perpendicular to the direction of the scanned line (the main scanning direction). Such a configuration is typical of what are called desktop scanners. However, there are also embodiments in which the copy holder moves along a fixed scanning unit.

To prepare the originals for scanning, the originals must be mounted on the copy holder, which is transparent as a rule. It is necessary for such a purpose for the copy holder to be illuminated using diffuse light, in order to be able to view the originals during mounting and to align them precisely. For flatbed scanners with a movable copy holder, this is achieved by virtue of the fact that the copy holder is positioned over a light box. No solutions yet exist for flatbed scanners with a fixed copy holder.

SUMMARY OF THE INVENTION

It is accordingly an object of the invention to provide an apparatus for viewing originals that overcomes the hereinafore-mentioned disadvantages of the heretofore-known devices of this general type and that is for a flatbed scanner with a fixed copy holder and a movable scanning unit.

With the foregoing and other objects in view, there is provided, in accordance with the invention, an apparatus for viewing originals in a flatbed scanner, including a fixed copy holder for holding the originals, the copy holder having an upper side for the originals and a lower side, a movable scanning unit having a light source illuminating an original to be scanned, an optoelectronic transducer converting scanning light from the original and modulated by content of the original into an electric signal, and a scanning lens projecting a scanned line of the original onto the optoelectronic transducer, a light source disposed at the lower side, a dispersion foil connected to the scanning unit, the scanning unit drawing the dispersion foil at the lower side of the copy holder when the scanning unit is in a parking position, and the scanning unit moving the dispersion foil when the scanning unit traverses along the copy holder during scanning.

With the objects of the invention in view, there is also provided an apparatus for viewing originals in a flatbed scanner, including a fixed copy holder for holding the originals, the copy holder having an upper side for the originals and a lower side, a movable scanning unit having a light source illuminating an original to be scanned, an optoelectronic transducer converting scanning light from the original and modulated by content of the original into an electric signal, and a scanning lens projecting a scanned line of the original onto the optoelectronic transducer, a light source disposed at the lower side farther from the copy holder than the scanning unit, and a dispersion foil connected to the scanning unit, the scanning unit drawing the dispersion foil at the lower side of the copy holder when the scanning unit is in a parking position, and the scanning unit moving the dispersion foil when the scanning unit traverses along the copy holder during scanning.

In accordance with another feature of the invention, the optoelectronic transducer and the scanning lens are disposed at the lower side.

In accordance with a further feature of the invention, the scanning lens is disposed between the optoelectronic transducer and the lower side.

In accordance with an added feature of the invention, the light source is disposed at the upper side.

In accordance with an additional feature of the invention, the scanning unit moves the dispersion foil along the lower side when the scanning unit traverses along the copy holder during scanning.

In accordance with yet another feature of the invention, the scanning unit moves at least part of the dispersion foil away from the lower side when the scanning unit traverses along the copy holder during scanning.

In accordance with yet a further feature of the invention, the dispersion foil is stretched tight when the scanning unit is in the parking position.

In accordance with yet an added feature of the invention, there is provided a spring connected to the dispersion foil for stretching the dispersion foil.

In accordance with yet an additional feature of the invention, the spring stretches the dispersion foil tight when the scanning unit is in the parking position.

In accordance with again another feature of the invention, there is provided a weight connected to the dispersion foil for stretching the dispersion foil.

In accordance with again a further feature of the invention, the weight stretches the dispersion foil tight when the scanning unit is in the parking position.

In accordance with again an added feature of the invention, there is provided a reel connected to the dispersion foil for stretching the dispersion foil.

In accordance with again an additional feature of the invention, the reel stretches the dispersion foil tight when the scanning unit is in the parking position.

In accordance with still another feature of the invention, the reel has a spring for stretching the dispersion foil.

In accordance with a concomitant feature of the invention, the reel has a motor drive for reeling in and stretching the dispersion foil.

Other features that are considered as characteristic for the invention are set forth in the appended claims.

Although the invention is illustrated and described herein as embodied in an apparatus for viewing originals, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
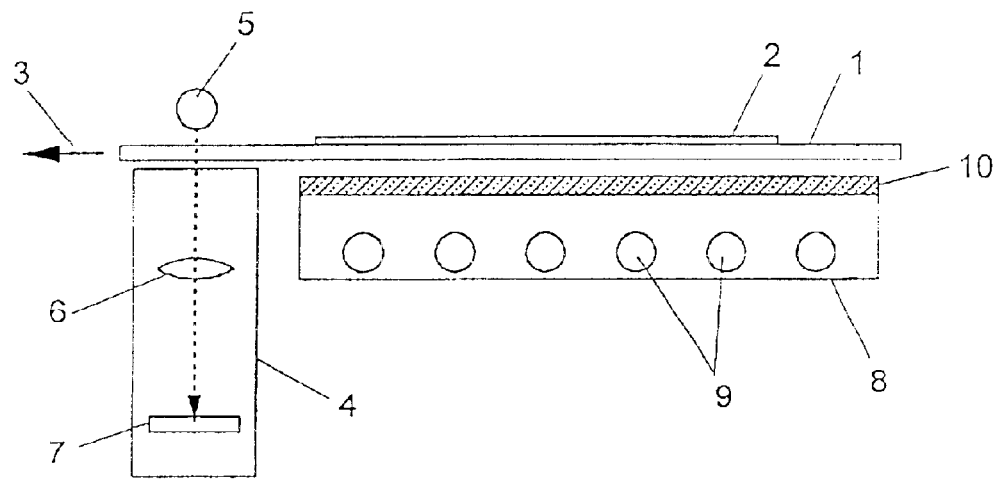
FIG. 1 is a cross-sectional, diagrammatic view of a prior art apparatus for viewing originals in a flatbed scanner with a movable copy holder.

Referring now to the figures of the drawings in detail and first, particularly to FIG. 1 thereof, there is shown a prior art solution for an apparatus for viewing originals in a flatbed scanner with a transparent, movable copy holder (1) on which one or more originals (2) to be scanned are mounted. During the scanning operation, the copy holder (1) is moved past the fixed scanning unit (4) in the direction of the arrow (3). A transparent original (2) is illuminated by a light source (5) that is disposed above the copy holder (1). The scanning light, modulated by the image content of the original (2) and transmitted through the original, is projected by a scanning lens (6) onto an optoelectronic transducer (7) that is, for example, an CCD row. A non-transparent reflection original is illuminated by a light source disposed below the copy holder, but is not illustrated in FIG. 1 for the sake of clarity. In such a case, the scanning light modulated by the image content of the original (2) and reflected by the original, is projected onto the optoelectronic transducer (7) through the scanning lens (6). In the position shown in FIG. 1 for mounting and viewing the originals, a light box (8) is disposed under the copy holder (1). The light sources (9) in the light box illuminate from below a scattered light plate (10) that is integrated into the lid of the light box (8). The scattered light plate (10) scatters the light diffusely such that transparent originals (2) are illuminated uniformly through the copy holder.

Such a solution for viewing originals according to the prior art cannot be used when the copy holder (1) is fixed and the scanning unit (4) is moved along under the copy holder because a light box for viewing originals would then block the movement of the scanning unit (4).

Figure 2:
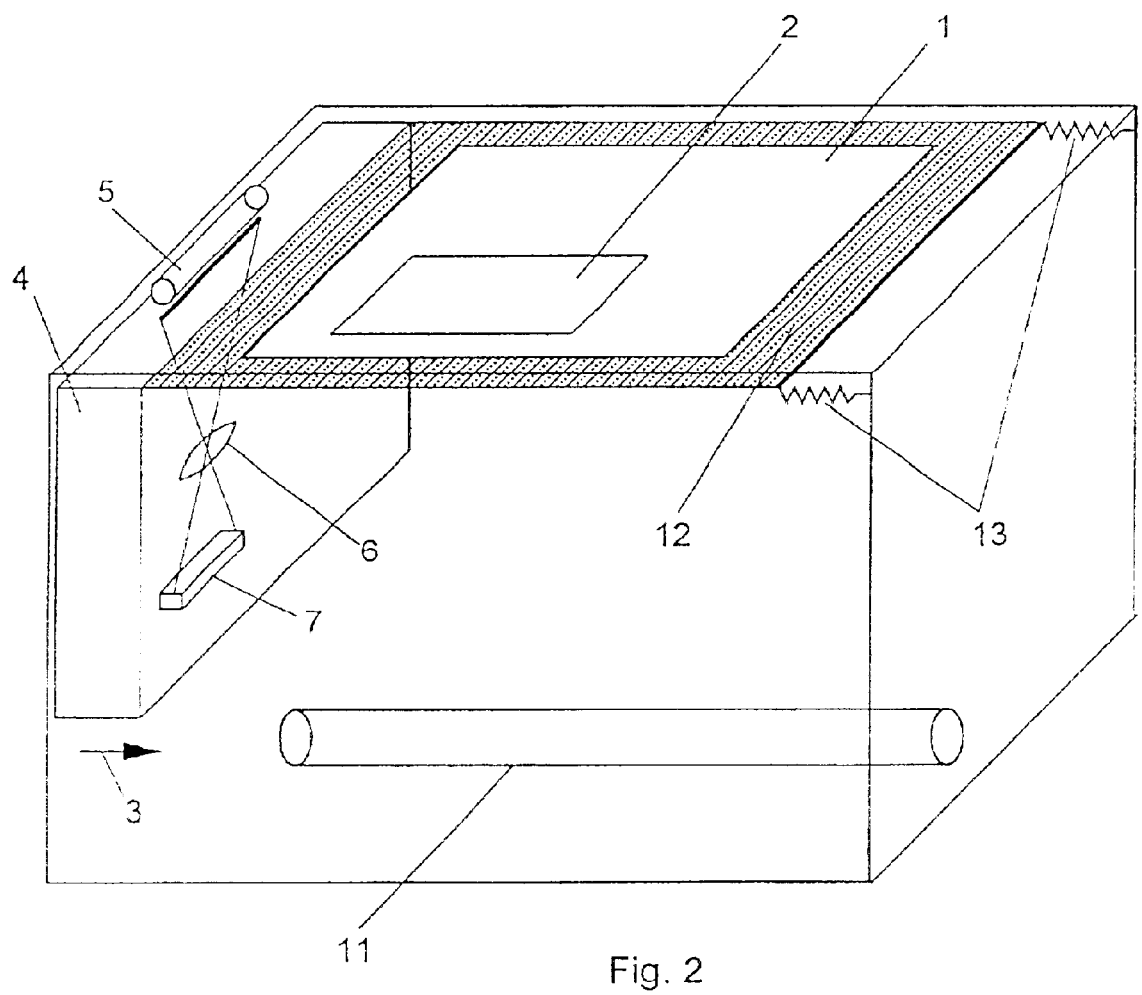
FIG. 2 is a perspective view of an apparatus for viewing originals according to the invention for a flatbed scanner with a fixed copy holder in a position for mounting and viewing the originals.

FIG. 2 shows the apparatus for viewing originals according to the invention in a flatbed scanner with a fixed copy holder (1) and a movable scanning unit (4). During the scanning operation, the scanning unit (4) is moved past under the copy holder (1) in the direction of the arrow (3). A transparent original (2) is illuminated by a light source (5) that is disposed above the copy holder (1) moves along with the scanning unit (4). The scanning light transmitted through the original (2) and modulated is projected onto the optoelectronic transducer (7) through the scanning lens (6). A non-transparent reflection original is illuminated by a light source disposed below the copy holder, which light source is not shown in FIG. 2 for the sake of clarity.

FIG. 2 shows the scanning unit (4) in a parking position in which the originals (2) can be mounted on the copy holder (1).

To illuminate the originals, one or more light sources (11) are disposed below the copy holder (1) such that the movement of the scanning unit (4) is not impeded. The light source (11) is, therefore, preferably fitted at the bottom of the flatbed scanner. Fastened on the top edge of the scanning unit (4) is a dispersion foil or scattered light film (12) whose opposite edge is fastened on that side of the flatbed scanner that is opposite the parking position of the scanning unit (4). Tension springs (13) or other suitable stretching devices ensure that the dispersion foil (12) is stretched tight below the copy holder (1) when the scanning unit (4) is in its parking position. The dispersion foil (12) scatters the light of the light source (11) diffusely such that transparent originals (2) are illuminated uniformly through the copy holder (1). The free space in the flatbed scanner below the copy holder (1) then has the function of a light box.

Figure 3:
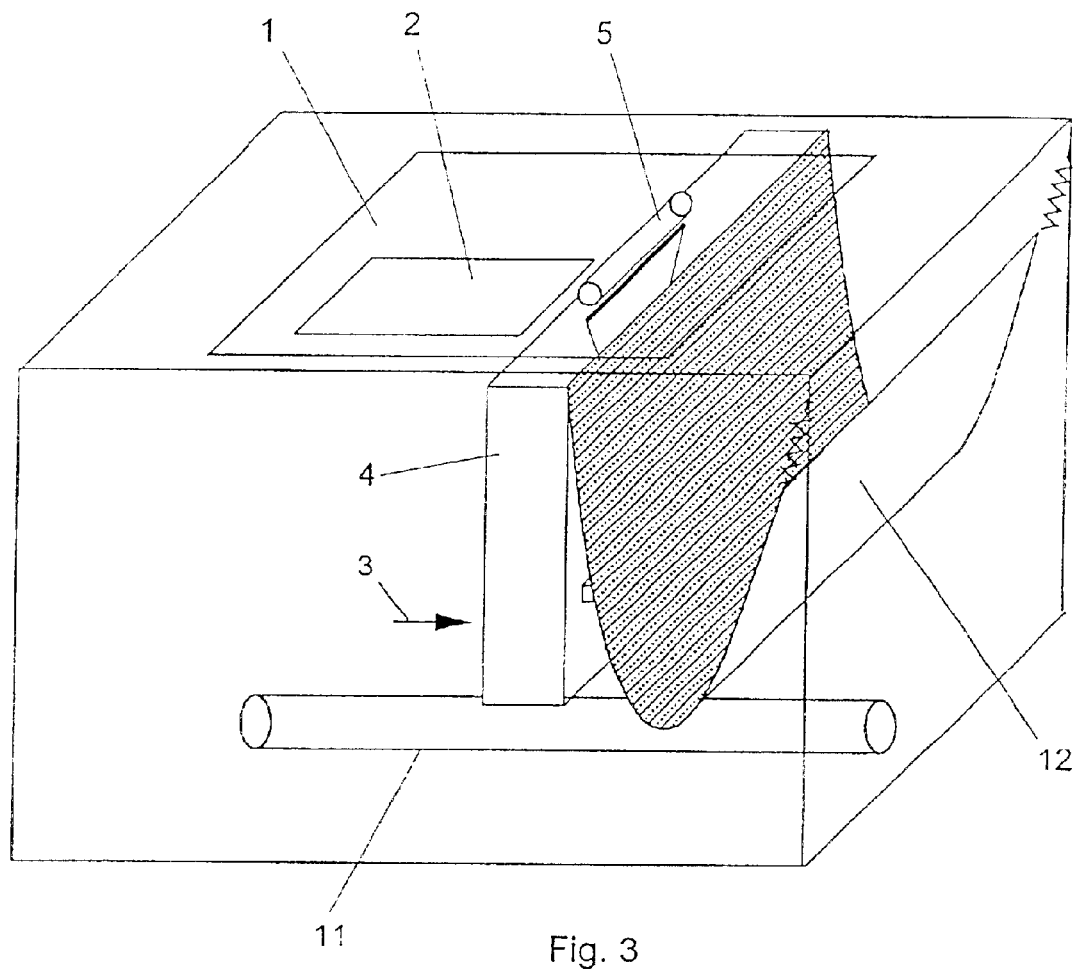
FIG. 3 is a perspective view of the apparatus of FIG. 2 during a scanning operation.

FIG. 3 shows the apparatus for reading originals according to the invention, once again during the scanning operation. The scanning unit (4) moves along in the direction of the arrow (3) under the copy holder (1) and the original (2). In such a case, the dispersion foil (12) is drawn away under the copy holder (1) with the movement of the scanning unit (4) so as to free the light path for the scanning light from the light source (5) up to the optoelectronic transducer (7).

Figure 4A:
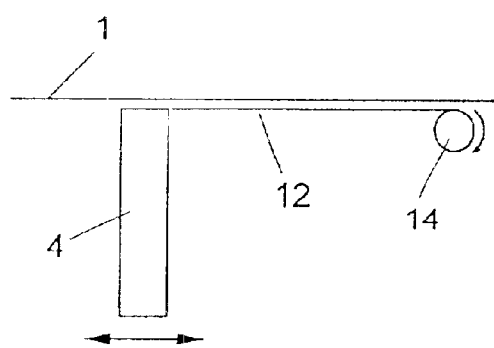
FIG. 4a is cross-sectional diagrammatic view of an alternative embodiment of the apparatus for viewing originals according to FIG. 2.
Figure 4B:
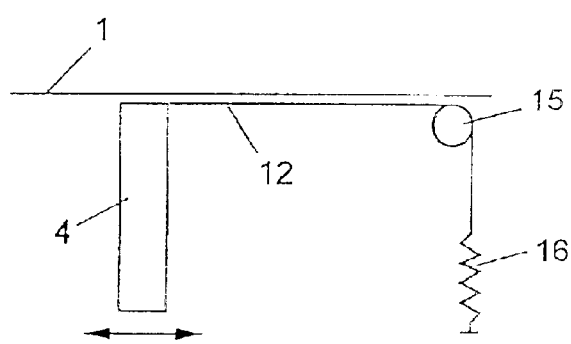
FIG. 4b is cross-sectional diagrammatic view of another alternative embodiment of the apparatus for viewing originals according to FIG. 2.

FIGS. 4a and 4b show alternative solutions for the apparatus for viewing originals according to the invention. In the case of the solution according to FIG. 4a, the dispersion foil (12) is reeled up and stretched tight with the aid of a spring mechanism or a motorized drive (14). In the case of the solution according to FIG. 4b, the dispersion foil (12) is guided over a deflecting roller (15) and stretched tight with the aid of one or more tension springs (16). A weight for stretching the dispersion foil (12) could also be used instead of the tension springs (16). Further embodiments of the basic idea of the invention, namely to draw a scattered light film (12) under the copy holder (1), or to draw it away, with the aid of the scanning unit, are conceivable, in particular, for constructing the guidance and stretching of the dispersion foil (12).

I claim:

1. An apparatus for viewing originals in a flatbed scanner, comprising:

a fixed copy holder for holding the originals, said copy holder having an upper side for the originals and a lower side;

a movable scanning unit having:

a light source illuminating an original to be scanned;

an optoelectronic transducer converting scanning light from the original and modulated by content of the original into an electric signal; and a scanning lens projecting a scanned line of the original onto said optoelectronic transducer;

a light source disposed at said lower side;

a dispersion foil connected to said scanning unit;

said scanning unit drawing said dispersion foil at said lower side of said copy holder when said scanning unit is in a parking position; and said scanning unit moving said dispersion foil when said scanning unit traverses along said copy holder during scanning.

2. The apparatus according to claim 1, wherein said optoelectronic transducer and said scanning lens are disposed at said lower side.

3. The apparatus according to claim 2, wherein said scanning lens is disposed between said optoelectronic transducer and said lower side.

4. The apparatus according to claim 2, wherein said light source is disposed at said upper side.

5. The apparatus according to claim 1, wherein said scanning unit moves said dispersion foil along said lower side when said scanning unit traverses along said copy holder during scanning.

6. The apparatus according to claim 1, wherein said scanning unit moves at least part of said dispersion foil away from said lower side when said scanning unit traverses along said copy holder during scanning.

7. The apparatus according to claim 1, wherein said dispersion foil is stretched tight when said scanning unit is in said parking position.

8. The apparatus according to claim 1, including a spring connected to said dispersion foil for stretching said dispersion foil.

9. The apparatus according to claim 8, wherein said spring stretches said dispersion foil tight when said scanning unit is in said parking position.

10. The apparatus according to claim 1, including a weight connected to said dispersion foil for stretching said dispersion foil.

11. The apparatus according to claim 10, wherein said weight stretches said dispersion foil tight when said scanning unit is in said parking position.

12. The apparatus according to claim 1, including a reel connected to said dispersion foil for stretching said dispersion foil.

13. The apparatus according to claim 12, wherein said reel stretches said dispersion foil tight when said scanning unit is in said parking position.

14. The apparatus according to claim 12, wherein said reel has a spring for stretching said dispersion foil.

15. The apparatus according to claim 12, wherein said reel has a motor drive for reeling in and stretching said dispersion foil.

16. An apparatus for viewing originals in a flatbed scanner, comprising:

a fixed copy holder for holding the originals, said copy holder having an upper side for the originals and a lower side;

a movable scanning unit having:
a light source illuminating an original to be scanned;
an optoelectronic transducer converting scanning light from the original and modulated by content of the original into an electric signal; and
a scanning lens projecting a scanned line of the original onto said optoelectronic transducer;

a light source disposed at said lower side farther from said copy holder than said scanning unit; and a dispersion foil connected to said scanning unit;

said scanning unit drawing said dispersion foil at said lower side of said copy holder when said scanning unit is in a parking position; and said scanning unit moving said dispersion foil when said scanning unit traverses along said copy holder during scanning.

17. The apparatus according to claim 16, wherein said optoelectronic transducer and said scanning lens are disposed at said lower side.

18. The apparatus according to claim 17, wherein said scanning lens is disposed between said optoelectronic transducer and said lower side.

19. The apparatus according to claim 17, wherein said light source is disposed at said upper side.

20. The apparatus according to claim 16, wherein said scanning unit moves said dispersion foil along said lower side when said scanning unit traverses along said copy holder during scanning.

21. The apparatus according to claim 16, wherein said scanning unit moves at least part of said dispersion foil away from said lower side when said scanning unit traverses along said copy holder during scanning.

22. The apparatus according to claim 16, including a spring connected to said dispersion foil for stretching said dispersion foil.

23. The apparatus according to claim 16, including a weight connected to said dispersion foil for stretching said dispersion foil.

24. The apparatus according to claim 16, including a reel connected to said dispersion foil for stretching said dispersion foil.

* * * * *